(12) United States Patent
Takemura et al.

(10) Patent No.: US 7,189,171 B2
(45) Date of Patent: Mar. 13, 2007

(54) ROLLING BEARING FOR BELT DRIVEN CONTINUOUSLY VARIABLE TRANSMISSION

(75) Inventors: Hiromichi Takemura, Fujisawa (JP); Yoshitaka Hayashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/947,393

(22) Filed: Sep. 17, 2004

(65) Prior Publication Data

US 2005/0092396 A1 May 5, 2005

Related U.S. Application Data

(63) Continuation of application No. PCT/JP03/03725, filed on Mar. 26, 2003.

(30) Foreign Application Priority Data

| Mar. 27, 2002 | (JP) | .............................. | 2002-087407 |
| Jun. 5, 2002 | (JP) | .............................. | 2002-164263 |

(51) Int. Cl.
*F16H 55/56* (2006.01)

(52) U.S. Cl. ......................................... 474/8; 384/492
(58) Field of Classification Search ................... 474/8, 474/18, 28; 384/492
See application file for complete search history.

(56) References Cited

U.S. PATENT DOCUMENTS

| 4,871,268 | A | * | 10/1989 | Furumura et al. | .......... 384/492 |
| 5,032,108 | A | | 7/1991 | Taniguchi et al. | |
| 5,672,014 | A | | 9/1997 | Okita et al. | |
| 6,322,466 | B1 | * | 11/2001 | Eidloth | ......................... 474/8 |
| 6,478,894 | B1 | * | 11/2002 | Mitamura et al. | .......... 148/328 |
| 6,565,677 | B1 | * | 5/2003 | Takemura et al. | .......... 148/325 |
| 2001/0044350 | A1 | | 11/2001 | Nishigaya et al. | |

FOREIGN PATENT DOCUMENTS

| DE | 199 55 565 | 6/2000 |
| EP | 1 156 235 | 11/2001 |
| EP | 1 099 869 | 1/2005 |
| GB | 2 345 296 | 7/2000 |
| JP | 2-159454 | 6/1990 |
| JP | 8-311603 | 11/1996 |
| JP | 11-101247 | 4/1999 |
| JP | 2001-200851 | 7/2001 |
| JP | 2001-323939 | 11/2001 |

OTHER PUBLICATIONS

International Search Report dated Jul. 22, 2003.
International Preliminary Examination Report dated Nov. 2, 2004 (Translation).

* cited by examiner

*Primary Examiner*—Vicky A. Johnson
(74) *Attorney, Agent, or Firm*—Katten Muchin Rosenman LLP

(57) ABSTRACT

A bearing is provided to have sufficient durability even when CVT fluid having a low viscocity is used, with its flow rate kept small, so that the efficiency of the belt-type continuously variable transmission is improved.

The material of the races including the outer race 4 is made of a iron-base alloy containing, by weight, C of from 0.15% to 0.5%, Si of 0.1% to 1.5%, Mn of 0.1% to 1.5%, and Cr of 0.5% to 3.0%. This material is subjected to carbonitriding, quenching, tempering and quenching finish. The surface portion of the outer raceway 6 on the inner peripheral surface of the outer race 4 is formed with a surface layer containing C of from 0.8 weight % to 1.2 weight % and N of from 0.05 weight % to 0.50 weight %.

7 Claims, 4 Drawing Sheets

Fatigue index

Fatigue index

ROLLING BEARING FOR BELT DRIVEN CONTINUOUSLY VARIABLE TRANSMISSION

CROSS-REFERENCE TO RELATED APPLICATION

The present application is a continuation of International Application No. PCT/JP03/03725 which was filed on Mar. 26, 2003.

BACKGROUND OF THE INVENTION

1. Field of the Invention

This invention relates to the improvement of a rolling bearing for supporting the rotating shaft, for example the pulley shaft, of a belt-type continuously variable transmission (CVT) for the wheels of an automobile or the like. More specifically, together with stabilizing the friction coefficient at the area of friction engagement between the belt and pulley, it makes possible construction that is capable of maintaining sufficient durability even when using a low-viscosity CVT fluid (combined use as ATF oil) in order for low fuel consumption.

2. Description of the Background Art

Various kinds of belt-type continuously variable transmissions have been considered in the past, such as disclosed in Japanese Patent Unexamined Publication No. H08-30526, as the transmission unit of an automatic transmission for an automobile, and some are actually in use. FIG. 1 shows the basic construction of this kind of belt-type continuously variable transmission. The belt-type continuously variable transmission comprises a rotating shaft 1 on the input side and a rotating shaft 2 on the output side and they are arranged such that they are parallel with each other. These rotating shafts 1, 2 are each rotatably supported by a pair of rolling bearings 3 inside the transmission casing (not shown in the figure).

As shown in detail in FIG. 2, each of these rolling bearings 3 has an outer race 4 and inner race 5 that are concentric with each other. Of these, the outer race 4 has an outer raceway 6 formed around its peripheral inner surface, and the inner race 5 has an inner raceway 7 formed around its outer peripheral surface. A plurality of rolling elements 8 are located between the outer raceway 6 and inner raceway 7, and they are supported by a retainer 9 such that they can roll freely. The outer race 4 of each of the rolling bearings 3 that are constructed in this way, is fitted and fastened into part of the transmission casing, and the inner race 5 is fitted and fastened onto the rotating shaft 1 on the input side or onto the rotating shaft 2 on the output side. Also, with this construction, both of the rotating shafts 1, 2 are supported on the inside of the transmission casing such that they rotate freely. Conventionally, a bearing having an outer race 4, inner race 5 and rolling elements 8 that were made of SUJ2 bearing steel were used as the rolling bearing 3.

Of the rotating shafts 1, 2, the rotating shaft 1 on the input side is rotated by a driving source 10 such as an engine by way of the starting clutch 18 of a torque converter or solenoid clutch. Also, a drive-side pulley 11 is located in the section that is located between the pair of rolling bearings 3 in the middle section of the rotating shaft 1 on the input side, and this drive-side pulley 11 and the rotating shaft 1 on the input side are rotated in synchronization. The space between the pair of drive-side pulley plates 12a, 12b of the drive-side pulley 11 can be freely adjusted by using the actuator 13 on the drive side to move the drive-side pulley plate 12a (the left one in FIG. 1) in the axial direction. In other words, the groove width of the drive-side pulley 11 can be freely widened or narrowed by the drive-side actuator 13.

On the other hand, a follower-side pulley 14 is located in the section between the pair of rolling bearings 3 in the middle section of the rotating shaft 2 on the output side, and this follower-side pulley 14 rotates in synchronization with the rotating shaft 2 on the output side. The space between the pair of follower-side pulley plates 15a, 15b of this follower-side pulley 14 can be freely adjusted by moving the follower-side pulley plate 15a (the right one in FIG. 1) in the axial direction by the follower-side actuator 16. In other words, the groove width of the follower-side pulley 14 can be freely widened or narrowed by the follower-side actuator 16. Also, an endless belt 17 runs around this follower-side pulley 14 and the drive-side pulley 11. A metal belt is used for this endless belt 17.

In the belt-type continuously variable transmission constructed as described above, the power transmitted from the driving source 10 to the rotating shaft 1 on the input side by way of the starting clutch 18, is transmitted from the drive-side pulley 11 to the follower-side pulley 14 by way of the endless belt 17. A belt that transmits power in the pushed direction and a belt that transmits power in the pulled direction are known as this kind of endless belt 17. In either case, the power that is transmitted to the follower-side pulley 14 is transmitted from the rotating shaft 2 on the output side to the drive shaft 21 by way of a reduction gear train 19 and differential gear 20. When the transmission gear ratio between the rotating shaft 1 on the input side and the rotating shaft 2 on the output side is changed, the groove widths of both pulleys 11 are widened or narrowed in relation to each other.

For example, when the deceleration ratio between the rotating shaft 1 on the input side and the rotating shaft 2 on the output side is increased, the groove width of the drive-side pulley 11 increases, and also the groove width of the follower-side pulley 14 decreases. As a result, in the sections where the endless belt 17 runs around of both pulleys 11, 14, the diameter in the section of the drive-side pulley 11 becomes smaller and the diameter in the section of the follower-side pulley 14 becomes larger, and deceleration occurs between the rotating shaft 1 on the input side and the rotating shaft 2 on the output side. On the other hand, when the acceleration ratio between the rotating shaft 1 on the input side and the rotating shaft 2 on the output side is increased (the deceleration ratio is decreased), the groove width of the drive-side pulley 11 decreases and the groove width of the follower-side pulley 14 increases. As a result, in the sections where the endless belt 17 runs around of both pulleys 11, 14, the diameter in the section of the drive-side pulley 11 becomes larger and the diameter in the section of the follower-side pulley 14 becomes smaller, and acceleration occurs between the rotating shaft 1 on the input side and the rotating shaft 2 on the output side.

When the belt-type continuously variable transmission that is constructed and function as described above is operating, lubrication oil is supplied to all of the moving parts to lubricate these moving parts. CVT fluid (combined use as ATF oil) is used as the lubrication oil for the belt-type continuously variable transmission. The reason for this is to increase and stabilize the friction coefficient at the area of friction engagement between the metal endless belt 17 and the drive and follower-side pulleys 11, 14. Also, the CVT fluid is circulated at the area of friction at a flow rate of 300 cc/min or more, to lubricate this area of friction. Moreover, pat of the CVT fluid passes through the inside of the rolling bearings 3 (for example at a flow rate of 20 cc/min or more) to lubricate the area of rolling contact of the rolling bearings 3. Therefore, there is a good possibility that foreign matter such as abrasive material that is generated due to the friction between the metal endless belt 17 and the pulleys 11, 14, or gear powder that is generated due to friction in the reduction gear train 19, will get into and become mixed with the CVT fluid. This foreign matter causes damage to the rolling contact areas in the rolling bearings 3 and causes a drop in the durability of the bearings. Therefore, conventionally, by making the size of the rolling bearings 3 larger, or by increasing the diameter (ball diameter) of the rolling elements 8, the basic dynamic load rating of the rolling bearings 3 was increased to give extra life to these rolling bearings 3.

The frequency (f: Hz) of vibration in the belt constructed as described above is expressed using the number of friction pieces (Zb) and the rpm of the belt (Nb: rpm) as "f=Zb× (Nb/60)". Normally, the number of friction pieces is 250 to 400 pieces, and in this case, when the rpm of the engine changes from 600 rpm to 7,000 rpm, the first component of the frequency of the vibration that occurs in the primary pulley is 1,000 Hz to 3,000 Hz during deceleration, and 10,000 Hz to 35,000 Hz during acceleration.

This frequency is higher than the frequency of the vibration that occurs when the gears mesh in a manual transmission (MT) or in a normal automatic transmission (AT) (except for the continuously variable transmission). This is thought to be because the number of friction pieces for a belt-type CVT is 250 to 400, and is more than the number, specifically 50 or less of gear teeth that mesh in the case of a MT and AT.

Also, when the automobile is in operation, acceleration and deceleration are repeated, so there may be resonation of the belt vibration and body vibration. Moreover, vibration at various frequencies occurs in the body, and thus it becomes easy for resonance to occur frequently with the belt. As a result, it becomes easy for large vibration to occur in the rolling bearings for the belt-type CVT.

On the other hand, for a belt-type CVT, it is desired that the power transmission efficiency of the belt be improved, noise of the belt drive be controlled, and that friction between the pulleys and the belt be suppressed, and from these aspects, it is preferred that lubrication oil having high fluidity (low viscosity) be used.

In recent years, with the object of maintaining the efficiency of the belt-type continuously variable transmission, keeping noise that is generated during operation to a minimum, and suppressing friction between the drive-side pulley 11 and follower-side pulley 14 and the endless belt 17, the use of CTV fluid having an even lower viscosity has been considered as the lubrication oil. In that case, when using standard bearings as the rolling bearings 3 for supporting the rotating shaft 1 on the input side and the rotating shaft 2 on the output side, it is thought that there is a larger possibility of premature flaking due to insufficient oil layer formation rather than flaking that starts at the point of indentation due to foreign matter mixed in the oil. In other words, since the rolling bearings for supporting the rotating shaft of the pulley are located on the side surfaces of the pulley, it is difficult for lubricant to be supplied, and when CVT fluid having a low viscosity is used, there would be larger possibility that the state of the oil layer formed at the areas of rolling contact between the outer raceway 6 and inner raceway 7 and the rolling elements 8 will be insufficient due to the vibration acting in the radial direction and axial direction as the belt varies. Also, it is thought that the possibility of premature flaking due to slippage will increase at the areas of rolling contact.

In other words, in the case of rolling bearings 3 comprising an outer race 4, inner race 5 and rolling elements 8 that are made from typical bearing steel such as SUJ2, it is thought that the possibility of premature flaking due to slippage will increase when CVT fluid having a low viscosity is used in which the kinematic viscosity of the base oil is 40 mm$^2$/sec or lower (40×10$^{-6}$ m$^2$/sec or lower) at 40, and is 10 mm$^2$/sec or lower at 100. In that case, when the temperature of the rolling bearings 3 during operation of the belt-type continuously variable transmission exceeds 100, the viscosity of the CVT fluid penetrating in the rolling bearing 3 for lubrication on the rolling contact area becomes a very low value of 10 mm$^2$/sec or less. As a result, the strength of the oil film that exists at the area of rolling contact decreases, and it becomes easy for the oil film at the area of rolling contact to be broken up due to effects such as differential motion, revolution, or spinning. Also, when the oil film is broken up, metallic contact occurs at this area of rolling contact, which promotes fatigue of the surface layer and causes premature flaking to occur. Of course, by increasing the basic dynamic load rating of the rolling bearings 3 and giving extra life to the rolling bearings 3, it is possible to maintain the required durability, however, since the weight due to increasing the size of the bearing increases and the rolling resistance increases, it is not desirable. Also, by increasing the flow rate of the CVT fluid that passes through the rolling bearings 3, it is possible to prevent the oil film from breaking up, and it is also possible to improve durability. However, this method causes a drop in the efficiency of the overall belt-type continuously variable transmission due to the increase of pump loss due to the circulating large amounts of CVT fluid, which is not desirable.

Incidentally, a substantial portion of the loading applied to the rolling bearings 3 installed in the belt-type continuously variable transmission is radial loading that is applied from the endless belt 17, and the direction of this radial loading is always constant. Also, of the rolling contact area of the rolling bearing 3, the inner raceway 7 and the rolling contact surface of the rolling elements 8 rotates, but the outer raceway 6 does not rotate. Accordingly, fatigue of the surface layer advances the most in a specific section of the outer raceway 6 (section that supports the radial loading). In other words, the outer raceway 6 is subjected to the most severe condition with respect to the rolling fatigue life. Therefore, maintaining the rolling fatigue life of the outer raceway 6 is important from the aspect of maintaining the overall durability of the rolling bearing 3.

For example, FIGS. 3(A) and 3(B) show the fatigue level at the area of rolling contact when using CVT fluid with a low viscosity as the lubrication oil, which are the results found through fatigue analysis for a typical gear-type transmission and belt-type continuously variable transmission. The fatigue analysis is a measurement method disclosed in Japanese Patent Examined Publication No. S63-34423 of measuring fatigue level due to rolling contact fatigue, and the fatigue level is expressed as F=B+KR (where B is the decrease in the half value width of X-ray diffraction in the Martensitic-phase; K is a constant that differs according to the material, and R is the amount of decrease of retained austenite). In other words, in order to find the fatigue level F, the half value width of X-ray diffraction in the Martensitic-phase before and after rolling fatigue at the area of rolling contact between the metal materials, and the amount (volume %) of retained austenite are measured. Moreover, the constant set for the type of material is taken to be K, and the difference between the amount of retained austenite before the fatigued state and the amount of retained austenite in the fatigued state is taken to be .R. Also, the difference in the half value width of X-ray diffraction in the Martensitic-phase before the fatigued state and the half value width of X-ray diffraction in the Martensitic-phase in the fatigued state is taken to be .B. The fatigue level F is then found by substituting the reduced amount .B of the half value width of X-ray diffraction in the Martensitic-phase, and the reduced amount .R of the retained austenite into the equation F=K..R+.B. Also, this fatigue level F is correlated and evaluated with reference values that are created beforehand and that correspond to each location of rolling contact, to measure the fatigue level at each of these locations.

In the results of the fatigue analysis performed under these conditions shown in FIGS. 3(A) and 3(B), FIG. 3(A) shows the fatigue level of the outer raceway of a rolling bearing that is installed in a typical gear-type transmission, and FIG. 3(B) shows the fatigue level of the outer raceway of a rolling bearing installed in a belt-type continuously variable transmission. The higher the value of the fatigue level is the more the fatigue progresses, which indicates that the flaking life becomes short. The fatigue level shown in FIG. 3(A) for the surface of the outer raceway of the rolling bearing installed in a typical gear-type transmission was 1.4, while the fatigue level shown in FIG. 3(B) for the same part in a belt-type continuously variable transmission was 2.8, or twice as high.

As can be clearly seen from FIG. 3(A) and FIG. 3(B), when CVT fluid having a low viscosity is used as the lubrication oil for a belt-type continuously variable transmission, it becomes easy for premature flaking to occur in the outer raceway of the rolling bearings of the rotation-support unit of the belt-type continuously variable transmission.

Taking the above conditions into consideration, in order to obtain a belt-type continuously variable transmission having excellent transmission efficiency and sufficient durability, this invention was made to provide a rolling bearing for a belt-type continuously variable transmission in which it is difficult for damage such as premature flaking to occur in the outer raceway 6 of the rolling bearing 3 for supporting the pulley such that it rotates freely, even when CVT fluid having a low viscosity is used as the lubrication oil.

DISCLOSURE OF THE INVENTION

Similar to the conventionally known rolling bearing for a belt-type continuously variable transmission, the rolling bearing for a belt-type continuously variable transmission of this invention comprises: an outer race, inner race and a plurality of rolling elements.

Of these, the outer race has an outer raceway formed around its inner peripheral surface.

The inner race has an inner raceway formed around its outer peripheral surface.

The rolling elements are located between the outer raceway and the inner raceway such that they can roll freely.

Moreover, the outer race is fitted into and supported by the fixed section of the transmission casing; the inner race is fitted onto and supported by the section, such as on the end or the middle of the rotating shaft on the input and output sides, that rotates together with the pulley of the belt-type continuously variable transmission; and the pulley is supported at the fixed section such that it can rotate freely.

Particularly, in a first embodiment of the rolling bearing for belt-type continuously variable transmission of this invention, at least the outer race is made from an iron-base alloy containing, by weight, 0.15% to 0.5% C, 0.1% to 1.5% Si, 0.1% to 1.5% Mn and 0.5% to 3.0% Cr that undergoes carbonitriding, quenching, and tempering processing, and then is finished with grinding.

Also the surface of the outer raceway has a surface layer that contains, by weight, 0.8% to 1.2% C, and 0.05% to 0.50% N.

Moreover, it is preferred that the surface layer has a surface hardness of Hv 720 to Hv 900, and that in the section from the surface of the outer raceway to the depth where the maximum shear stress occurs, a carbide or carbonitride ($M_3C$, $M_7C_3$) having an average particle diameter of 50 nm to 500 nm be dispersed and precipitated.

Also, preferably, the amount of retained austenite at 50 μm under the surface of the outer raceway is, by volume, 20% to 45%, and the residual compression stress at 50 μm under the surface of the outer raceway is 150 MPa to 500 MPa.

Furthermore, it is preferable that, by weight, 0.1% to 3.0% Mo and/or 0.1% to 3.0% V be contained.

It is also preferable that the concentration of residual oxygen be 9 ppm or less, that the amount of P contained be 0.02 weight % or less, and that the amount of S contained be 0.02 weight % or less. Also, it is presumed that this invention is applied to an outer raceway under severe conditions for rolling fatigue. However, in addition to the outer raceway, there is a good possibility that the weakest section will be the inner race or rolling elements, so in order to satisfy the required life, it is preferred that the invention be applied to the inner raceway and rolling elements as well.

In the case of the rolling bearing for belt-type continuously variable transmission of this invention constructed as described above, it is possible to sufficiently maintain the flaking life even when CVT fluid having a low viscosity is used such that it is not possible to sufficiently maintain the strength of the oil film that is located at the area of rolling contact.

First, by performing proper surface processing of material having proper composition to form a proper surface layer, it is possible to maintain the rolling fatigue life of the outer raceway that is subjected to particularly severe conditions during use.

Particularly, when the surface hardness of the surface layer is made to be from Hv 720 to Hv 900, and a carbide or carbonitride having an average particle size of from 50 nm to 500 nm is dispersed and precipitated out in a specified section, it is possible to more effectively maintain the rolling fatigue life. In other words, it is possible to delay the advancement of surface fatigue at the area of rolling contact even when CVT fluid having a low viscosity is used and this viscosity is lowered even more due to operation under high-temperature conditions of 100 or more, so that the strength of the oil film that exists at the area of rolling contact becomes low such that localized metal contact occurs.

Moreover, keeping the amount of retained austenite in a specified location at a proper value, it is possible to alleviate minute flaking and scratching that may occur on the surface at the area of rolling contact even though there may be localized metal contact that occurs as described above. Also, by keeping the residual compression stress at this specified section at proper value, it is possible to suppress the propagation of cracks or flaking and to further improve the effect of preventing premature flaking even when minute cracking or flaking occurs on the surface at the area of rolling contact.

Furthermore, by having the material contain 0.1 to 3.0 weight % of Mo and/or 0.1 to 3.0 weight % of V, it becomes possible to control the particle size of the aforementioned carbide or carbonitride, and to precipitate out the carbide or carbonitride is minute particles. Also, it is possible to reduce the amount of C in this matrix.

The rolling bearing for a belt-type continuously variable transmission of this invention functions as described above, and makes it possible to maintain the rolling fatigue life even under conditions such as when the strength of the oil film at the area of rolling contact becomes weak, and localized metal contact occurs. Therefore, it is no longer necessary to use a large bearing having a large basic dynamic load rating as the rolling bearing in order to maintain the necessary durability. Therefore, it is possible to make the rotation support section for the rotating shafts on the input and output sides more compact and lightweight, and it becomes possible to maintain sufficient durability with construction having low rotational resistance. In this case, it is not necessary to pass a large amount (for example, much greater than 20 cc/min) of lubrication oil through the inside of the rolling bearing.

By doing this, it is possible to make the bearing more compact and lightweight, as well as to secure the rolling fatigue life of the rolling bearing having low rolling resistance, and thus it is possible to make the belt-type continuously variable transmission more compact and light weight and improve the transmission efficiency.

Next, the reason for adding each of the elements to the iron-base alloy for manufacturing the belt-type continuously variable rolling bearing of this invention, and the reason for the regulated values, including the amounts of each of the contained elements, of this invention will be explained.

Of the elements contained in the material, first, C is included for the carbonitriding process for increasing the hardness of the surface to the required value (for example from Hv 720 to Hv 900) in order to maintain the rolling fatigue life of the raceway surface. In order that the processing time of this carbonitriding process is not too long, it is necessary for the material to contain 0.15 weight % or more of C. On the other hand, if the amount of C exceeds 0.50 weight %, the toughness of the material decreases, and cracking strength of the race made of the material drops, and thus it becomes difficult to maintain dimensional stability at high temperature. Therefore, the amount of C contained in the material is from 0.15 weight % to 0.50 weight %.

Next, the Si has the effect of delaying the change to white structure that is seen in the races under rolling fatigue, and is also added for improving the hardenability. However, when the amount of Si added is less than 0.1 weight %, the resistance to temper softening become insufficient, and after heat treatment it becomes difficult to adequately maintain the surface hardness of the outer raceway. On the other hand, when the amount of Si contained in the material exceeds 1.5 weight %, the workability of the material greatly drops. Therefore the amount of Si contained in the material is from 0.1 weight % to 1.5 weight %.

Next, Mn is added in order to improve the quenching property of the steel (steel alloy). However, when the amount of Mn added is less than 0.1 weight %, it is difficult to maintain adequate quenching. On the other hand, when the amount added exceeds 1.5 weight %, the workability of the material drops. Therefore, the amount of Mn contained in the material is 0.1 weight % to 1.5 weight %.

Next, Cr is added for improving the quenching characteristics and promoting spheroidizing of the carbide. In order to obtain these effects, it is necessary that the amount of Cr contained in the material be 0.5 weight % or more. On the other hand, when the amount of Cr exceeds 3.0 weight %, there is a possibility that the machinability (ease of cutting) of the material will decrease, and processing of the outer raceway will become troublesome. Therefore, the amount of Cr contained in the material is from 0.5 weight % to 3.0 weight %.

Also, Mo is selectively contained in the material (it is not essential in working the invention). When Mo is contained in the material, it improves the resistance to temper softening, and due to the effect of dispersing minute carbides in the material, it is able to improve the hardness of the material and of the outer race obtained from the material and improve the high-temperature strength. When adding Mo to obtain this effect, the amount of Mo added must be 0.1 weight % or more. The reason for this is, that by adding Mo, the amount of C that is solubilized into the matrix decreases, and minute Mo-base carbides are precipitated out. On the other hand, when the amount of Mo added exceeds 3.0 weight %, the solid solution is insufficient so that the Mo-base carbides do not become minute, and there is a possibility that workability will become even worse. Therefore, when Mo is contained in the material, the amount is 0.1 weight % to 3.0 weight %.

V is also selectively contained in the material (it is not essential in working the invention). V contained in the material is precipitated out in the crystal grain boundary, so as to suppress the crystal particles from becoming coarse, and it combines with the carbon in the steel to form minute carbides. Also, the addition of V improves the surface hardness of the outer race, and thus improves the resistance to wear. Moreover, due to the hydrogen trap effect, the effect of delaying the change to white structure can be expected. This kind of effect becomes remarkable when the amount of V contained in the material is 0.1 weight % or more. On the other hand, when the amount of V contained in the material exceeds 3.0 weight %, large V carbides precipitate out at the crystal grain boundary to cause the pinning effect to decrease, and the workability and mechanical properties of the material becomes even worse. Therefore, when V is added to the material, the amount contained is kept from 0.1 weight % to 3.0 weight %.

By performing solution treatment of Mo and/or V, it becomes possible to control the particle size of the Mo-base and V-base carbides ($M_3C$, $M_7C_3$), and thus it is possible to disperse and precipitate out minute carbides, and as a result it is possible to reduce the amount of C in the matrix. Therefore, this has the effect of delaying a change in the structure due to the diffusion of C in matrix fatigue, and as a result it improves the rolling fatigue life. This kind of dispersion and precipitation effect includes an effect of suppressing crack propagation, an effect of improving resistance to wear, and the hydrogen trap effect for controlling resistance to hydrogen embrittlement.

In other words, by performing proper heat treatment on the iron-base alloy material having the composition described above, it is possible to disperse and precipitate out 10 or more carbides or carbonitrides ($M_3C$, $M_7C_3$) per 10 $m^2$. Furthermore, by controlling the particle size of the Mo-base or V-base carbides ($M_3C$, $M_7C_3$) by performing the solution treatment of the Mo and/or V as described above, it is possible to disperse and precipitate out 40 or more carbides per 10 $m^2$ and to obtain an even better durability.

Next, the C and N in the surface layer of the raceway surface will be explained.

First, C is contained in the surface layer in order to obtain the necessary hardness for maintaining the rolling fatigue life of the raceway after carbonitriding is performed for the race and the raceway of surface has been ground and finished. In order to give the surface layer the necessary hardness (Hv 720 or more) for sufficiently maintaining the rolling fatigue life of the surface layer of the raceway, the amount of C contained in the surface layer must be 0.8 weight % or more. However, when the amount contained exceeds 1.2 weight %, it becomes easy for large carbides to be generated in the surface layer, which easily become starting points for damage such as cracking. Therefore, the amount of C contained in the surface layer is regulated from 0.8 weight % to 1.2 weight %.

Also, N is contained in the surface layer in order to improve the tempering resistance of the surface layer, and to disperse and precipitate out minute carbides and/or nitrides to improve the strength. In order to obtain these effects, the amount of N contained in the surface layer must be 0.05 weight % or more. However, when the amount of N contained exceeds 0.50 weight %, the resistance to wear improves excessively, and this not only makes it difficult to grind the outer raceway for finishing, but also decreases the strength against brittle crack of the surface layer. Therefore the amount of N contained is regulated from 0.05 weight % to 0.50 weight %.

The explanation above was for the case in which the invention is applied to just the outer race, however, even when the invention is applied to the inner race or rolling elements in addition to the outer race, rolling fatigue life can be improved for each of the components in the same way.

In regards to adding O, P and S, they are not desirable elements from the aspect of accomplishing the object of the invention, so it is preferred that these elements be kept to as small amounts as possible.

First, O is an element that produces oxide-base inclusions and has the potential to become a non-metallic inclusion that becomes a starting point (fish eye) for damage such as cracking in bending stress fatigue, and reduces the rolling fatigue life. Therefore, it is preferred that the amount of O contained in the material should be as little as possible (as close to 0 as possible). From this aspect it is desirable that the amount of O contained in the material be less than 9 ppm.

Next, P is an element that lowers the rolling fatigue life and toughness. Therefore, it is desirable that the amount of P contained be as little as possible. From this aspect, it is preferred that the amount of P contained be kept to less than 0.02 weight %.

Furthermore, S is an element that improves machinability, however, it combines with Mn to form a sulfide-base inclusion that lower the rolling fatigue life. Also, improving the machinability can be obtained by adding an element other than S. Therefore, from the aspect of maintaining the rolling fatigue life of the outer race, it is desirable that the amount of S contained be as little as possible. From this aspect, it is preferred that the amount of S contained be less than 0.02 weight %.

In a second embodiment of this invention, a rolling bearing is provided to comprise a plurality of rolling elements that are located between an inner race and outer race such that they can roll freely, and where at least one of the inner race, outer race and rolling elements satisfy the conditions (1) to (5) below.

(1) Material is made of an alloy steel comprising the following ratios, by weight: carbon (C): from 0.60% to 1.20%; silicon (Si): from 0.10% and to 1.5%; manganese (Mn): from 0.10 to 1.5%; and chromium (Cr): from 0.50% to 3.0%, which is formed into a specified shape, and then subjected to carbonitriding, quenching and tempering.

(2) The amount of carbon contained in the surface layer (section from the surface to a depth of 50 m) of the raceway surface of the races and/or the rolling contact surface of the rolling elements is from 0.80 weight % to 1.30 weight %.

(3) The amount of nitrogen contained in the surface layer is from 0.05 weight % to 0.50 weight %.

(4) The hardness of the surface layer has a Vickers hardness (Hv) value from 700 to 850.

(5) The residual compression stress in the surface layer is between −100 MPa and −500 MPa.

With the rolling bearing of this invention, by constructing at least one of the inner race, outer race and/or rolling elements by making a specified alloy steel having carbon content, nitrogen content, hardness and residual compression stress described above, it is possible to lengthen the life of the rolling bearings that support the rotating shafts of the pulleys more than bearing formed using a conventional steel alloy (bearing steel such as SUJ2, case hardening steel such as SCR420 or SCM420), even when a lubrication oil having high fluidity (low viscosity) is used as the lubrication oil for the belt-type continuously variable transmission.

It is preferred that the rolling bearing of this invention further satisfies condition (6) and/or condition (7) below.

(6) The amount of retained austenite in the surface layer is from 15 volume % to 45 volume %.

(7) Carbide or carbonitride particles having an average particle size from 100 nm to 500 nm are dispersed and precipitated out in the surface layer.

The critical meaning of the numerical limits for each of the components of the alloy steel are as follows:

[Carbon (C) Content in the Alloy Steel: from 0.60 Weight % to 1.2 Weight %]

C is an element that increases the cleanliness of the steel and enters the matrix in solid solution to contribute to the hardness of the steel. Also, it combines with elements such as Cr, Mo, V and W to form carbides. In order for the hardness of the matrix to become Hv 650 after heat treatment, the amount of C in the material must be 0.60 weight % or more.

When the amount of C contained exceeds 1.20 weight %, it becomes easy for coarse and large eutectic carbides to be generated when manufacturing the steel, and so there is a possibility that the rolling fatigue life and impact resistance to greatly drop.

[Silicon (Si) Content in the Alloy Steel: from 0.10 Weight % to 1.5 Weight %]

Si has the effect of delaying the change to white structure that is seen during rolling fatigue, the effect of improving the hardenability, and the effect of improving the resistance to temper softening.

When the amount of Si contained is less than 0.10 weight %, it is not possible to sufficiently obtain the effect of improving the resistance to temper softening. When the amount of Si contained exceeds 1.5 weight %, workability drops greatly.

[Manganese (Mn) Content in Alloy Steel: from 0.10 Weight % to 1.5 Weight %]

Mn has the function of increasing the quench hardenability, and when the amount of Mn contained is less than 0.10 weight %, it is not possible to realistically obtain this function. When the amount of Mn exceeds 1.5 weight %, workability drops greatly.

[Chromium (Cr) Content in Alloy Steel: from 0.50 Weight % to 3.0 Weight %]

Cr is an element that enters in the matrix in solid solution and improves the quench hardenability, increases the resistance to temper softening, and improve corrosion resistance. Also, it is an element that forms minute carbides, and by prevent coarse and large crystal particles during heat treatment, it lengthens the rolling fatigue life and increases resistance to wear and heat. When the amount of Cr contained is less then 0.50 weight %, it is not possible to sufficiently obtain these functions.

When there is a large amount of Cr, it becomes easy for coarse and large eutectic carbides to be produced, and there is a possibility that the rolling fatigue life and mechanical strength will drop greatly. Particularly, when the amount of Cr exceeds 3.0 weight %, the machinability might decrease.

[Other Alloy Components and Unavoidable Impurities in the Alloy Steel]

Oxygen (O) generates oxide-base inclusions in the matrix. These inclusions become the starting points (fish eye) for bending stress fatigue, and cause the bearing life to decrease. Therefore, it is preferred that the O content be 9 ppm or less.

Phosphorus (P) is an element that decreases the rolling life and toughness. Therefore, it is preferred that the amount of P contained be 0.02 weight % or less.

Sulfur (S) is an element that improves the machinability, however, it combines with Mn to create sulfide-base inclusions. These inclusions decrease the rolling life. Therefore, it is preferred that the amount of S contained be 0.02 weight % or less.

[Carbon (C) Content in the Surface Layer: from 0.80 Weight % to 1.30 Weight %]

When the carbon content in the surface layer of the raceways of the races (inner race and/or outer race) and/or the rolling contact surfaces of the rolling elements is less than 0.8 weight %, it is not possible to obtain the necessary hardness for obtaining sufficient rolling fatigue life.

Also, when the amount of C exceeds 1.30 weight %, it becomes easy to generate large carbides. These large carbides easily become starting points for cracks.

[Nitrogen (N) Content in the Surface Layer: from 0.05 Weight % to 0.50 Weight %]

When the amount of N contained is greater than 0.05 weight %, it becomes easy for minute carbonitrides to be dispersed and precipitate out due to the function of improving the resistance to temper softening. When the amount of N exceeds 0.50%, grinding becomes difficult, and strength against brittle crack drops.

[Surface Layer Hardness: from Hv700 to Hv850]

When the hardness (surface hardness) of the surface layer of the raceways (raceways and/or rolling contact surfaces) is less than Hv700, it is not possible to sufficiently improve the resistance to wear or reduces the surface fatigue. Also, taking toughness into consideration, the upper limit of surface hardness is taken to be Hv850.

[Residual Compression Stress in the Surface Layer: from −100 MPa to −500 MPa]

By keeping the residual compression stress in the surface layer of the raceways within the range described above, it is possible to suppress the propagation of cracking and to prevent premature flaking even when minute cracking or flaking occurs in the surface layer.

[Amount of Retained Austenite in the Surface Layer: from 15 Volume % to 45 Volume %]

Retained austenite has the function of greatly reducing surface fatigue, however, in the case of a rolling bearing for supporting the rotating pulley shaft of a belt-type continuously variable transmission, it is not possible to sufficiently obtain this function when the amount of retained austenite is less than 15 volume %. It is preferred that the amount of retained austenite in the surface layer of the raceways etc. be greater than 20 volume %.

When the amount of retained austenite in the surface layer of the raceways etc. is greater than 45 volume %, there is a possibility that the surface hardness will drop and that the races will deform during installation.

[Average Particle Size of Carbides and/or Carbonitrides that are Dispersed and Precipitated out in the Surface Layer: from 100 nm to 500 nm]

By keeping the average particle size within the aforementioned range, it is possible to obtain the effect of suppressing crack propagation, the effect of improving resistance to wear, and a hydrogen trap effect for suppressing hydrogen embrittlement. The existence of average particle sized carbides and/or carbonitrides can be confirmed by the use of an electron microscope, and it is preferred that the abundance ratio be 10 or more per $10.m^2$ of the raceways etc. (raceway and/or rolling contact surface).

BEST EMBODIMENTS TO WORK THE INVENTION

Figure 1:
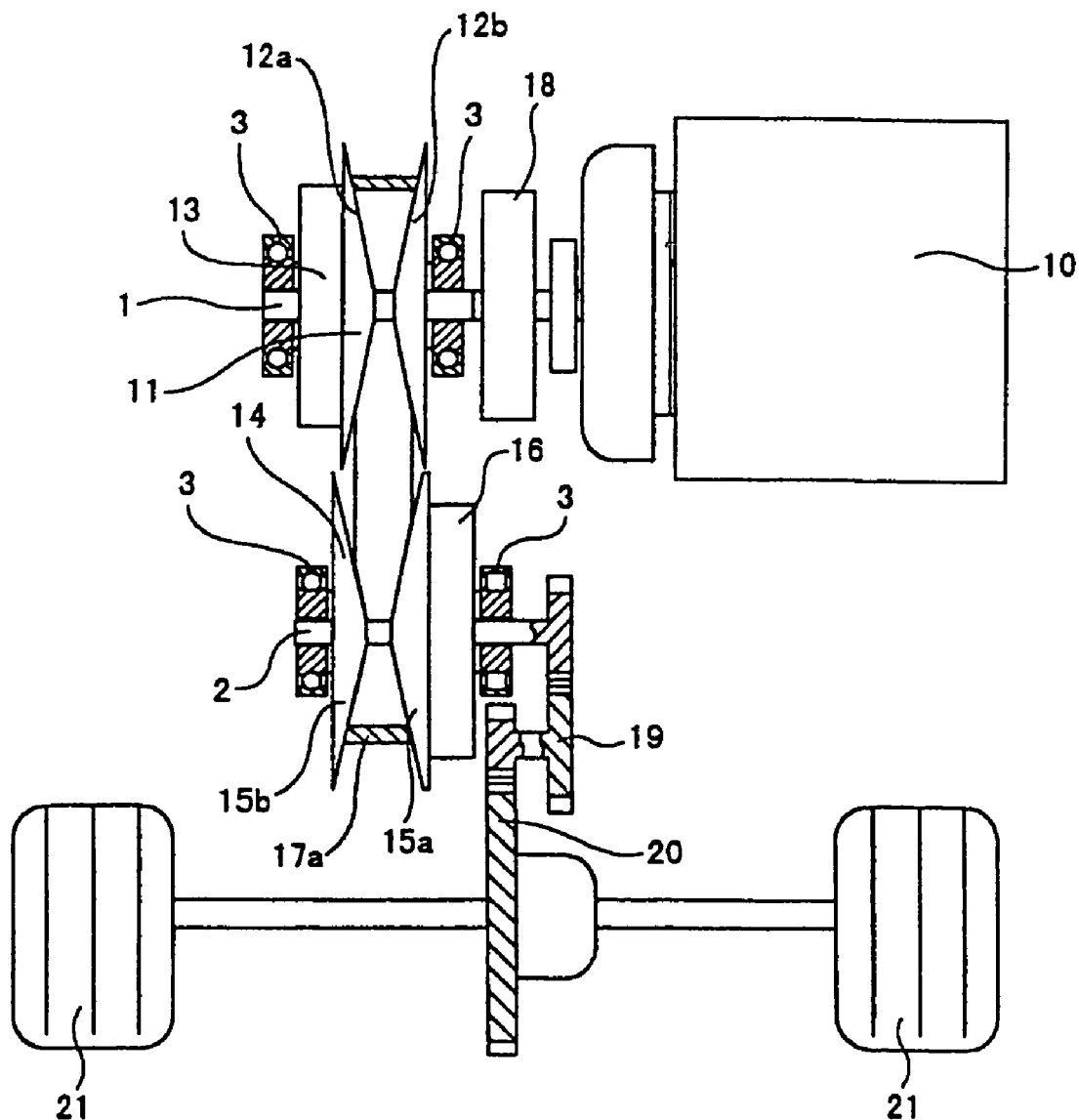
FIG. 1 is a cross-sectional view of the drive system of an automobile in which a belt-type continuously variable transmission having the rolling bearing of this invention is installed.
Figure 2:
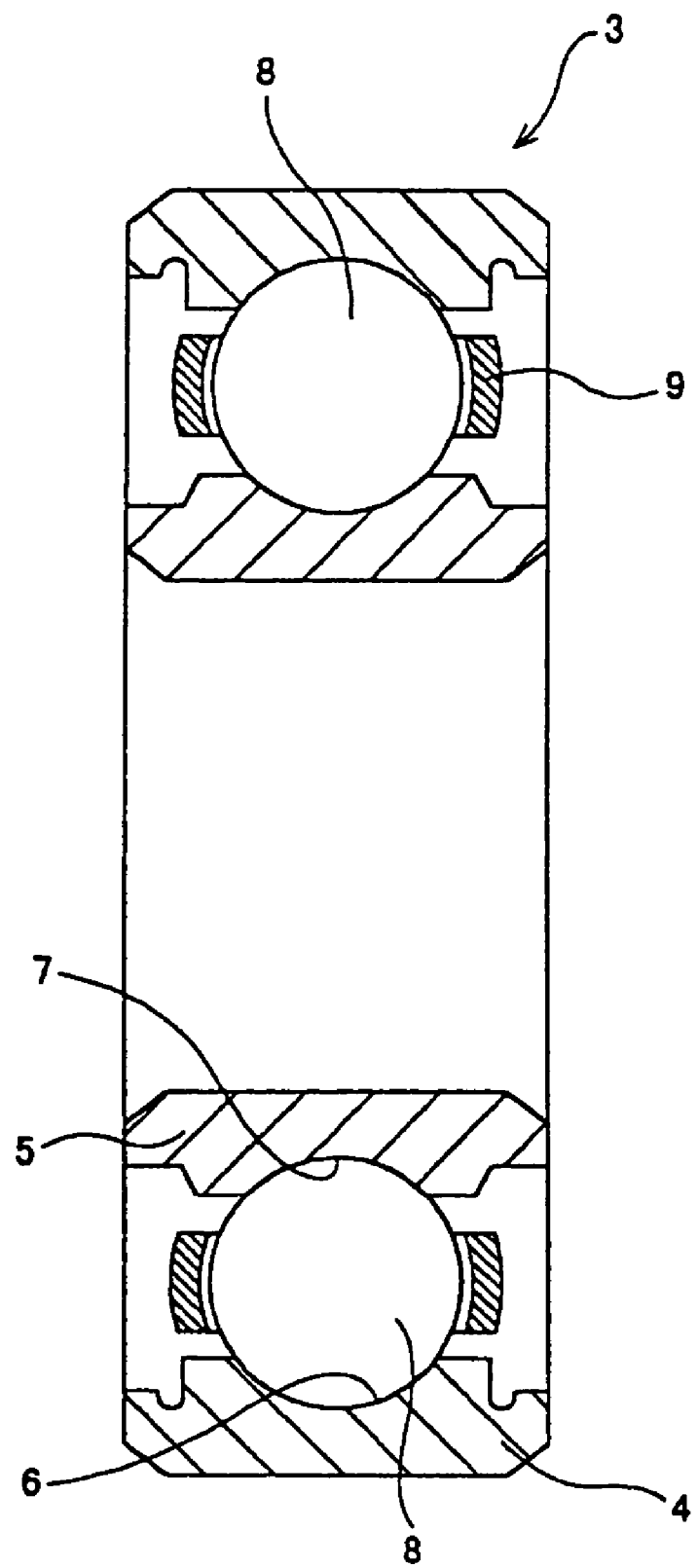
FIG. 2 is an enlarged cross-sectional view of the rolling bearing.
Figure 3A:
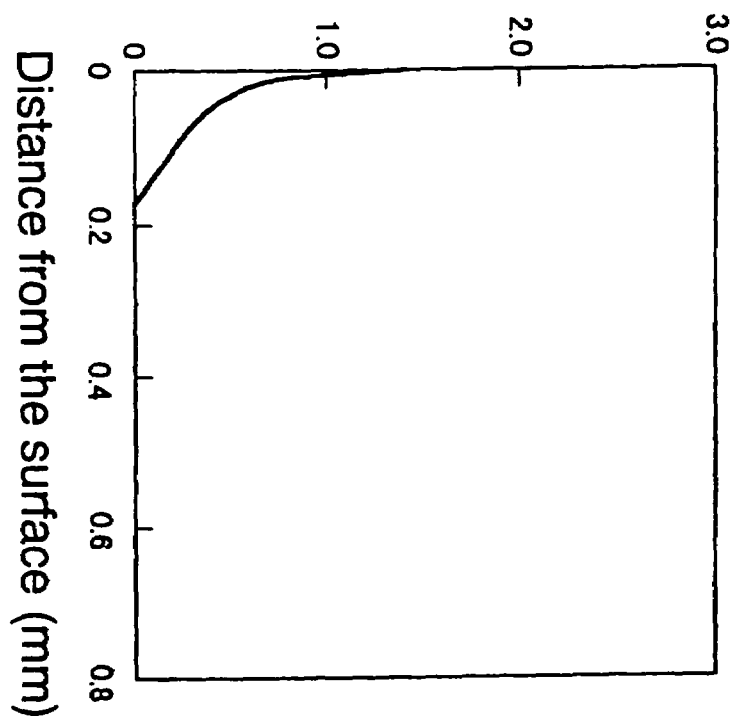
FIG. 3 is a graph showing the level of fatigue due to rolling fatigue in a typical gear-type transmission and a belt-type continuously variable transmission.
Figure 3B:
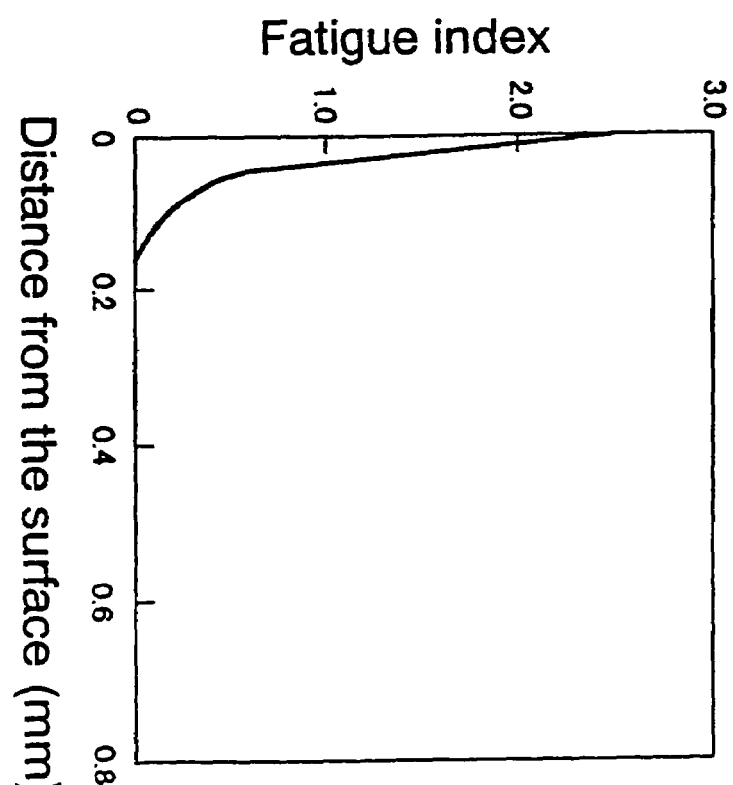

The feature of this invention relates to the outer race, inner race and rolling elements of a rolling bearing for supporting the input side rotating shaft and output side rotating shaft of a belt-type continuously variable transmission and to the improvement of the durability of the overall rolling bearing by designing the characteristics of at least the outer race. The construction shown in drawings, including that of the construction shown in FIG. 1, is substantially the same as that of the rolling bearing for a conventional belt-type continuously variable transmission. Therefore, a detailed explanation of the rolling bearing for the belt-type continuously variable transmission is omitted.

EXAMPLES

Next, tests that were performed for confirming the effect of the invention will be explained. As shown in Table 1 below, in the tests, ten kinds of test samples that were within the technical range of the present invention (examples 1 to 10), and eight kinds of test samples that were outside of the technical range of this invention (comparison examples 1 to 8), for a total of 18 kinds of test samples were prepared, and after the heat treatment shown in Table 1 was performed, the durability of each sample (level of fatigue and life $L_{10}$) was measured.

shaft 1 such that it could rotate freely with respect to the transmission casing. The bearing size was JIS number 6208 (inner diameter=40 mm, outer diameter=80 mm, width=18 mm). The roughness of the surface at the areas of rolling contact was the same as in a normal rolling bearing, with the

TABLE 1

|    |    | C | Si | Mn | Cr | Surface C | Surface N | Heat treatment | Surface hardness (Hv) | ·R (%) | $\delta_R$ (MPa) | fatigue level | life $L_{10}$(hour) |
|----|----|------|------|------|------|-----------|-----------|----------------|-----------------------|--------|------------------|---------------|---------------------|
| Ex | 1  | 0.32 | 0.77 | 0.60 | 1.00 | 1.00      | 0.05      | .              | 780                   | 35     | 225              | 1.4           | 1500 .              |
|    | 2  | 0.25 | 0.10 | 0.70 | 3.00 | 0.89      | 0.14      | .              | 835                   | 25     | 200              | 1.5           | 1500 .              |
|    | 3  | 0.40 | 0.21 | 0.1  | 1.04 | 1.08      | 0.05      | .              | 850                   | 40     | 250              | 1.3           | 1500 .              |
|    | 4  | 0.15 | 0.30 | 0.78 | 0.98 | 0.80      | 0.09      | .              | 720                   | 20     | 150              | 1.8           | 1015                |
|    | 5  | 0.39 | 1.5  | 0.65 | 0.50 | 0.98      | 0.15      | .              | 865                   | 30     | 305              | 1.2           | 1500 .              |
|    | 6  | 0.17 | 0.28 | 1.5  | 1.00 | 0.85      | 0.11      | .              | 750                   | 20     | 170              | 1.7           | 1100                |
|    | 7  | 0.50 | 0.15 | 0.67 | 0.97 | 1.20      | 0.14      | .              | 900                   | 45     | 500              | 1.2           | 1500 .              |
|    | 8  | 0.32 | 1.20 | 0.83 | 1.05 | 1.15      | 0.09      | .              | 830                   | 40     | 355              | 1.2           | 1500 .              |
|    | 9  | 0.39 | 0.33 | 0.61 | 1.01 | 1.01      | 0.16      | .              | 845                   | 35     | 430              | 1.2           | 1500 .              |
|    | 10 | 0.37 | 0.27 | 0.70 | 0.90 | 1.00      | 0.20      | .              | 840                   | 35     | 280              | 1.5           | 1500 .              |
| CE | 1  | 0.95 | 0.29 | 0.35 | 1.50 | —         | —         | T-hardening    | 750                   | 7      | −85              | 2.8           | 158                 |
|    | 2  | 0.05 | 0.39 | 0.77 | 1.00 | 0.85      | 0.15      | .              | 615                   | 18     | 150              | 2.6           | 105                 |
|    | 3  | 0.35 | 0.25 | 0.65 | 0.3  | 1.00      | 0.05      | .              | 800                   | 20     | 125              | 2.2           | 255                 |
|    | 4  | 0.65 | 0.18 | 0.77 | 1.05 | 1.40      | 0.14      | .              | 910                   | 20     | 150              | 2.5           | 135                 |
|    | 5  | 0.40 | 0.30 | 0.80 | 0.95 | —         | 0.35      | nitrided       | 825                   | 10     | 115              | 2.4           | 185                 |
|    | 6  | 0.35 | 0.03 | 0.03 | 1.11 | 0.85      | 0.14      | .              | 680                   | 20     | 150              | 2.6           | 125                 |
|    | 7  | 0.30 | 0.20 | 0.65 | 1.05 | 0.98      | —         | carbonitrided  | 750                   | 20     | 140              | 2.1           | 215                 |
|    | 8  | 0.45 | 0.15 | 0.80 | 5.9  | 1.20      | 0.10      | .              | 880                   | 13     | 100              | 2.0           | 295                 |

(Ex = Example)
(CE = Comparative Example, T-hardening = Through hardening)

In Table 1, the units of the numerical values for indicating the amounts of the chemical elements contained in the material is weight %. Also, besides the elements shown in Table 1, Fe and unavoidable impurities are contained in the material. Moreover, surface C and surface N are the amounts of C and N contained in the surface layer.

Figure 4A:
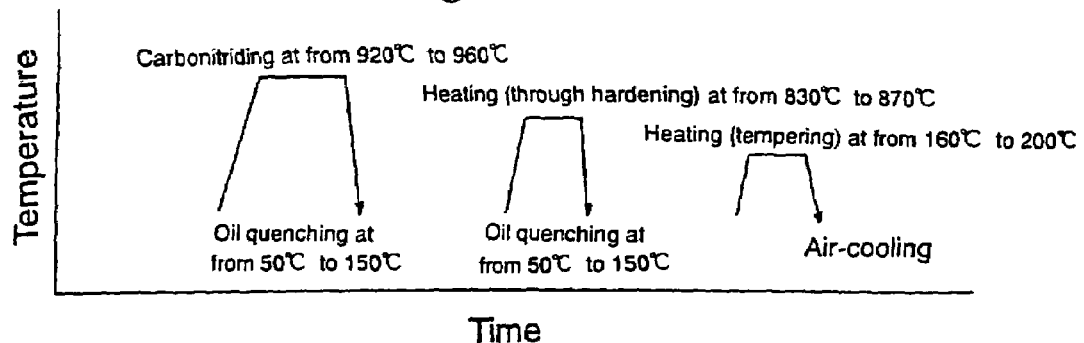
FIG. 4 is a drawing showing two examples of the heat treatment process for the outer race.
Figure 4B:
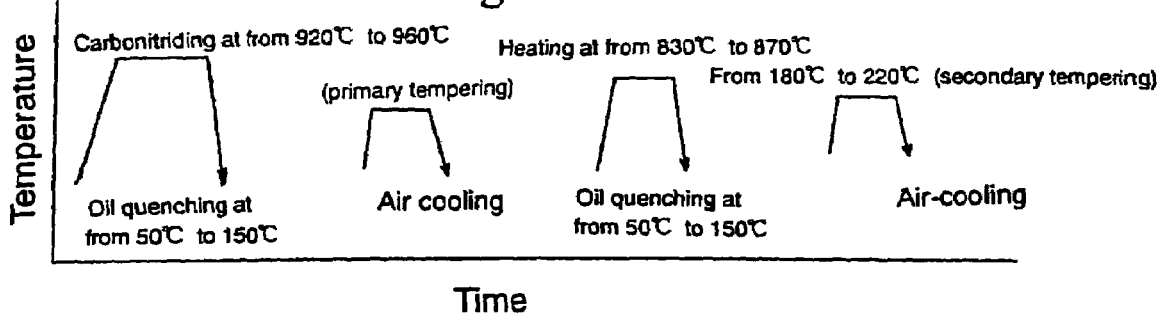

Also, heat treatment (1), (2) are performed by processes as shown in FIG. 4(A) and FIG. 4(B).

First, as shown in FIG. 4(A), in the case of heat treatment (1), the material was heated to from 920 to 960 in an atmosphere of endothermic gas, enriched gas and ammonia gas and heat treated for from 5 hours to 10 hours (carbonitriding process). After that, it is quenched in oil at from 50 to 150 (quenching). Next, it is heated at from 830 to 870 in an atmosphere of endothermic gas for from 0.5 hours to 3 hours (through hardening), after which it is quenched again in oil at from 50 to 150 (quenching). Then, after washing, it is heated in air at a temperature of from 160 to 200 for from 1 hours to 5 hours, after which it is cooled (tempering).

Moreover, as shown in FIG. 4(B), in the case of heat treatment (2), the material is heated to from 920. to 960. in an atmosphere of endothermic gas, enriched gas and ammonia gas, and heat treated for from 5 hours to 10 hours (carbonitriding). After that, it is quenched in oil at from 50 to 150. (quenching). Next, after washing, primary tempering is performed at from 160. to 220.. After that, it is heated to from 830 to 870. in an atmosphere of endothermic gas for from 0.5 hours to 3.0 hours, after which it is quenched in oil again at from 50. to 150.(quenching). Next, after washing, it is heated in air at from 160. to 220. for from 1 hours to 5 hours, and then cooled (secondary tempering).

The outer race having the composition shown in Table 1 and that was obtained by specified heat treatment and finishing was combined with an inner race and a plurality of rolling elements and installed in the belt-type continuously variable transmission as shown in FIG. 1 as the rolling bearing, and was used for supporting the input side rotating shaft 1 such that it could rotate freely with respect to the transmission casing. The bearing size was JIS number 6208 (inner diameter=40 mm, outer diameter=80 mm, width=18 mm). The roughness of the surface at the areas of rolling contact was the same as in a normal rolling bearing, with the arithmetic mean of the roughness Ra being from 0.01.m to 0.05.m. Also, a steel wave-shaped pressed retainer was used as the retainer 9.

Moreover, the durability of the outer raceway was measured under the conditions described below. The tests performed, in order to find the durability of the rolling bearing 3 that was installed in the support section for supporting rotation of the input side rotating shaft 1, a sufficient amount (200 cc/min) of lubrication oil (CVT fluid) was supplied to the rolling bearing 3 installed in the rotation support section for the output side rotating shaft 2. Also, SUJ2, for which carbonitriding was performed, was used for the rolling elements (balls) 8 of the rolling bearing that was not the object of the testing. It was arranged that damage did not occur in the rolling bearing 3 that was not the object of the testing before damage occurred in the rolling bearing 3 that was the object of the testing.

The test conditions were as follows:
Test apparatus: Belt-type continuously variable transmission shown in FIG. 1
No. of test samples: Six for each test (one for fatigue analysis)
Measurement method: As the test progresses, the rolling bearing is disassembled and checked for damage.
Input torque from the engine to the input side rotating shaft 1: 200 N·m
RPM of input side rotating shaft 1: 6000 rpm
Lubrication oil: CVT fluid {viscosity at 40=35×10$^{-6}$ m$^2$/s (35 cSt)}; viscosity at 100=7×10$^{-6}$ m$^2$/s (7 cSt)}
Flow rate of lubrication oil: 10 cc/min
Bearing temperature: 120
Continuous testing time: 1,500 hours
Target time: 1,000 hours
Fatigue analysis: After 100 hours, one of the six prepared test samples is analyzed for fatigue level.

The following was learned from the results of the tests performed under the conditions described above.

First, in example 4 and 6, flaking occurred in two test samples of each up until the testing was completed. However, in regards to the $L_{10}$ life, each sample was able to reach 1,015 hours, 1,100 hours, over the target 1,000 hours. The reason that durability was sufficiently maintained for examples 4 and 6 was that the amount of retained austenite.$_R$ and the residual compression stress$_R$ were properly regulated. This is made clear from the fact that after 100 hours, the levels of fatigue in the surface of the outer raceway were 1.8 and 1.7 respectively, which were lower values than the values in the comparative examples.

Furthermore, in examples 1 to 3, 5, and 7 to 10, no damage such as flaking occurred in any of the test samples, even after 1,500 hours, which was longer than the target time of 1,000 hours, and the fatigue level in the surface of the outer raceway was less than 1.5 in all of the examples. From this, it could be seen that durability could be even better maintained by either making the amount of retained austenite.$_R$ from 25 volume % to 45 volume %, or by making the residual compression stress.$_R$ from 200 MPa to 500 MPa.

On the other hand, in comparative example 1, in which the outer race was made of typical bearing steel SUJ2, flaking occurred in all five of the test samples, the level of fatigue was 2.8, and the $L_{10}$ life was 158 hours.

Moreover, in comparison examples 2 and 6, the surface hardness of the surface layer of the outer raceway was Hv 615 and Hv 680, respectively, which was low, so the fatigue level was 2.6, which was high, and the $L_{10}$ life also became shorter at 105 hours and 125 hours, respectively.

Furthermore, in comparative examples 3 to 5, 7 and 8, both the amount of retained austenite.$_R$ and the residual compression stress$_R$ were small, so the fatigue level of the surface of the outer raceway became higher than 2.0, flaking occurred in all five test samples, and the $L_{10}$ life was 255, 135, 185, 215 and 295 hours, respectively, which was less than ⅓ the target value of 1,000 hours.

In the tests described above, a single-row deep groove ball bearing without a seal ring was used. However, in the case of a unit in which a lot of wear powder occurs in the area of the friction fit between the pulleys and the belt, by giving extra space n the width dimension of the rolling bearing, it is possible to use a seal mechanism. In this case, a TM seal or metal plate non-contact-type seal ring, or a contact-type acrylic or fluororubber seal ring can be used as the seal mechanism. When a seal mechanism is selected, the proper construction is selected according to the operating temperature.

Also, the construction and material of the retainer is not particularly limited, however, when the rpm during operation is especially high, it is preferred that a synthetic resin crown-shaped retainer be used in order to reduce the friction between the retainer and rolling elements, and suppress the generation of hard wear powder in order to lengthen the life.

Furthermore, in the tests described above, the internal clearance of the rolling bearings of each test sample was a normal clearance, and the radius of curvature of both the cross-sectional shape of the outer raceway 6 and inner raceway 7 was 52% the diameter of the rolling elements 8. On the other hand, by properly regulating (keeping to a minimum) the internal clearance and the radius of curvature of the cross-sectional shape of the raceways 6, 7, to control the play in the radial direction and the play in the axial direction, it is possible to further improve performance such as the durability. Also, the rolling bearing is not limited to the single-row deep groove ball bearing shown in the figure, and substantially the same function and effect can be obtained in the case of other types of ball bearings such as an angular bearing, or cylindrical roller bearing or tapered roller bearing or needle roller bearing.

A second embodiment of the invention will be explained below.

First, 13 types of materials were prepared from alloy steels. The composition of each alloy steel is shown in Table 2. In Table 2, the amounts of each alloy component that are outside the range of the invention are underlined.

Using these alloy steels, inner races and outer races were manufactured for a radial ball bearing having nominal number 6208 (inner diameter 40 mm, outer diameter 80 mm, width 18 mm). When doing that, the raceway grooves of the inner races and outer races were formed such that the ratio (R/D) of the radius of curvature (R) of the raceway groove with respect to the diameter (D) of the balls was 52.0%.

Figure 5:
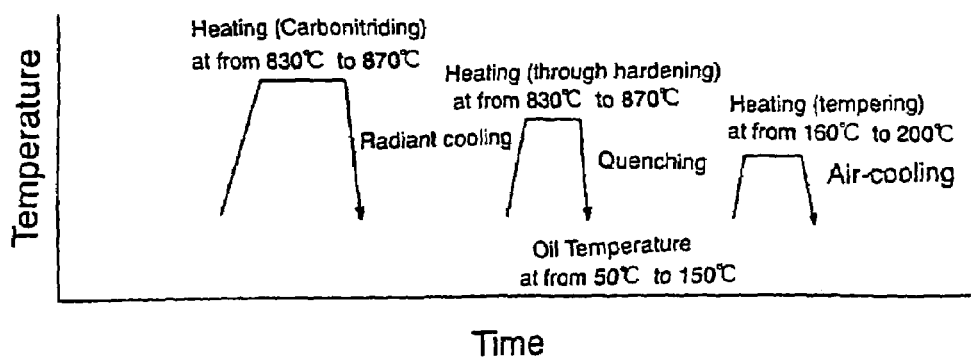
FIG. 5 is a drawing showing the heat treatment conditions performed in another embodiment.

After manufacturing alloy steels to a specified shape, carbonitriding, quenching and tempering were performed using the method shown in FIG. 5 as heat treatment, except for No. II7. For No. II7, the normal quenching and tempering were performed without performing carbonitriding.

First, carbonitriding was performed by heating the outer race and inner race to a temperature of from 830. to 930. in an atmosphere of endothermic gas, enriched gas and ammonia gas for from 2 hours to 5 hours, after which radiation cooling and washing were performed. Next, "through hardening" was performed by heating to from 830. to 870. in an atmosphere of endothermic gas for from 0.5 hours to 3.0 hours, and then quenching in oil was performed at an oil temperature of from 50. to 150.. Next, after washing, tempering was performed by heating in air at from 160. to 200. for from 1 hour to 5 hours. After that, the races were cooled. By this heat treatment, carbides and carbonitrides having an average particle size of 100 nm to 500 nm were dispersed and precipitated out in the surface layer.

After heat treatment, grinding and super finishing were performed. The surface roughness of the raceway grooves of the inner and outer races was kept within the range 0.10.mRa to 0.05.mRa.

Balls made of SUJ2 in the class 20 were prepared. The diameter (D) was 11.906 mm. Carbonitriding was performed for the balls. The test bearing was assembled using the balls, inner and outer races and a metal retainer pressed in the wave-shape.

For the inner and outer races of the test bearing, the 'C concentration (carbon content) in the surface layer of the raceway surfaces', 'N concentration (nitrogen content) in the surface layer of the raceway surfaces', 'average particle size of the carbides and/or carbonitrides that are dispersed and precipitated out in the surface layer', 'surface hardness (Hv) of the raceway surfaces', 'retained in the surface layer of the raceway surfaces (amount of retained austenite)' and 'residual compression stress in the surface layer of the raceway surfaces (residual) are as shown in Table 1. The internal radial clearance was up to the 'C3 clearance'. Also, in Table 2, composition that is outside the range of this invention is underlined.

Six test bearings for each composition were prepared, and the life testing was performed using the belt-type CVT unit shown in FIG. 1. In this belt-type CVT unit, the rotating shafts (input shafts) of the primary pulley 7 and the secondary pulley 8 are each supported by a pair of rolling bearings 11a, 11b, 12a, 12b. Of these four rolling bearings, the test bearing was installed as the primary front bearing 11a (in other words, the rolling bearing that supports the input shaft further toward the side of the engine than the primary pulley 7).

The same bearings were used in each test as the rolling bearings 11b, 12a, 12b.

Also, the belt 9 of this belt-type CVT unit is made by attaching 280 friction pieces 92 (2 mm thick) on to a double ring 91 that is made from ten layered steel plates (0.2 mm thick), and has a belt length of 600 mm.

The other test conditions are as given below.

<Life Test Conditions>

Input torque from the engine: 200 Nm
RPM of the input shaft: 6,000 rpm
Lubrication oil: Lubrication oil classified as CVT fluid, with a kinematic viscosity at 40 of $35 \times 10^{-5}$ m$^2$/s (35 cSt), and at 100 of $7 \times 10^{-5}$ m$^2$/s (7 cSt); and a friction coefficient of 0.013 at a sliding velocity of 0.5 m/s.
Supply amount of lubrication oil: 10 ml/min for the primary front bearing, and 200 ml/min for the other bearings.
Bearing Temperature: 120

Vibration was measured during rotation, and when the vibration of the bearing reached 5 times the initial vibration value, rotation was stopped and the time of rotation up to this point was taken to be the life. Also, at this time, the raceway groove surfaces of the inner and outer races were checked for flaking. In the case where the vibration of the bearing did not reach 5 times the initial vibration, the finish time of the test was taken to be 1,500 hours.

For one of the six test bearings of each type, the rotation test was stopped at a rotation time of 100 hours, and the level of fatigue (fatigue parameter F) was measured according to the method disclosed in Japanese Patent Examined Publication No. S63-34423. The half-value width of the peak that indicates the Martensitic phase and the amount of retained austenite are measured using x-ray diffraction for the raceway surfaces before and after rolling fatigue, and the fatigue parameter F is found using the difference .B in the half-value widths and the difference .RA in the retained austenite (volume %) before and after fatigue, and the constant K that is determined according to the material used for the raceway surfaces, and is expressed as $F = .B + K \times .RA$.

Also, the results of five test bearings for each type were plotted in a Weibull distribution graph (accumulated damage probability=life), and from this graph, the total rotation life (L10 life) until flaking occurs in 10% of the bearing on the short-life side.

These test results are shown in Table 2 below.

TABLE 2

| | inner race and outer race of test bearings | | | | | | | | | | | |
|---|---|---|---|---|---|---|---|---|---|---|---|---|
| | Alloy in Material (weight %) | | | | Concentration in the surface layer (weight %) | | Apd of carbide | Surface hardness | Retained | Residual | Test results | |
| No. | C | Si | Mn | Cr | C | N | etc. (nm) | (Hv) | (vol %) | (MPa) | Fatigue level | L10 Life(hour) |
| II1 | 0.95 | 0.70 | 0.45 | 1.20 | 1.05 | 0.05 | 150 | 780 | 35 | −400 | 1.3 | greater than 1500 |
| II2 | 0.88 | 0.10 | 0.33 | 3.00 | 0.89 | 0.10 | 200 | 830 | 25 | −250 | 1.4 | greater than 1500 |
| II3 | 1.01 | 0.24 | 0.10 | 1.04 | 1.08 | 0.05 | 300 | 850 | 45 | −350 | 1.3 | greater than 1500 |
| II4 | 0.75 | 0.33 | 0.88 | 0.98 | 0.80 | 0.08 | 400 | 700 | 20 | −150 | 1.7 | 1120 |
| II5 | 0.60 | 1.5 | 0.67 | 0.50 | 0.98 | 0.15 | 100 | 860 | 45 | −500 | 1.2 | greater than 1500 |
| II6 | 1.20 | 0.34 | 1.5 | 1.33 | 1.30 | 0.10 | 500 | 750 | 15 | −100 | 1.6 | 1050 |
| II7 | 1.00 | 0.30 | 0.35 | 1.50 | — | — | _950_ | 750 | _7_ | _+80_ | 2.6 | 130 |
| II8 | _0.05_ | 0.35 | 0.70 | 1.00 | _0.50_ | 0.15 | 300 | _600_ | 15 | −100 | 2.5 | 120 |
| II9 | 0.95 | 0.25 | 0.65 | _0.30_ | 1.00 | 0.05 | 350 | 800 | 20 | −130 | 2.2 | 240 |
| II10 | _1.30_ | 0.15 | 0.75 | 1.05 | _1.40_ | 0.10 | _750_ | _910_ | 25 | −150 | 2.5 | 255 |
| II11 | _0.40_ | 0.30 | 0.80 | 0.95 | _0.65_ | 0.35 | 450 | 700 | _10_ | −110 | 2.4 | 190 |
| II12 | 0.85 | _0.05_ | _0.05_ | 1.15 | 1.10 | 0.15 | 400 | _640_ | 20 | −120 | 2.5 | 110 |
| II13 | 0.95 | 0.30 | 0.50 | 1.40 | 1.00 | _0.10_ | 500 | 760 | 15 | _0_ | 2.5 | 125 |

(Apd = Average particle diameter)

As can be seen from these results, the test bearings No. II1 to II6, in which the inner race and outer race satisfy all ranges of the invention, have a lower fatigue level (less than 2.0) and a longer L10 life (greater than 1,000 hours) than the test bearings II7 to II13, in which at least either the inner race or outer race is outside the range of the invention.

Of test bearings No. II1 to II6, for test bearings No. II1 to No. II3, and No. II5, the fatigue level was less than 1.4 and the L10 life was 1,500 hours or more, which was a lower fatigue level and longer L10 life than that for test bearings No. II4 and No. II6. Also, for test bearings No. II1 to No. II3 and No. II5, no flaking was observed on the raceway surfaces of any of the five test bearings after 1,500 hours, however for test bearings No. II4 and No. II6, flaking occurred in two of the five test bearings. From this result, it can be seen that it is preferred that the amount of retained austenite be in the range from 25 volume % to 45 volume %, and that the residual compression stress be in the range of −250 MPa to −500 MPa.

On the other hand, in test bearings No. II7 to No. II13, the fatigue level was greater than 2.0 and the L10 life was short at from 110 hours to 255 hours. Particularly, in test bearings No. II7, the residual compression stress was +80 MPa, which was outside the range of the invention, and the amount of retained austenite was 7 volume %, which was also outside the range of the invention, so the L10 life was short 130, specifically hours and flaking occurred in all five of the test bearings. With test bearings No. II7, SUJ2 was used as the material and carbonitriding was not performed.

Moreover, in test bearings No. II8 and No. II12, the surface hardness was Hv600 and Hv640, respectively, which was less than the range of the invention, the fatigue level was greater than 2.5, and the L10 live was short, specifically 120 hours and 110 hours, respectively. Also, in test bearings No. II11, the amount of retained austenite was 10 volume %, which was less than the range of this invention, so the L10 life was short, specifically 190 hours. Furthermore, in test bearings no. II13, the residual compression stress was 0 MPa, which was outside the range of the invention, so the L10 life was short, specifically 125 hours. Also, in test bearings No. II9 to II11, flaking occurred in all five of the test bearings.

By making test bearings No. II1 to No. II6 such that the inner race and outer race are within the range of the invention, it was possible to obtain a rolling bearing in which it is difficult for rolling fatigue to occur and that has a long life, even when lubrication oil having high fluidity (low viscosity) is used in radial ball bearings that support the pulley shafts of a belt-type continuously variable transmission.

INDUSTRIAL APPLICABILITY

The rolling bearing for a belt-type continuously variable transmission of this invention is constructed and functions as described above, so it is possible to obtain sufficient durability even when CVT fluid having a low viscosity is used and the flow rate is kept low. Therefore, it is possible to improve the efficiency of the belt-type continuously variable transmission while at the same time maintain the durability.

Moreover, with this invention, by making at least one of the inner race, outer race and rolling elements out of a specified alloy steel, and making the carbon content, nitrogen content, hardness and residual compression stress of the surface layer of the raceway surfaces such that they are within a specific range, it is possible to make the life of the rolling bearings for supporting the rotating shafts of the pulleys longer than bearings made of a conventional steel alloy (bearing steel such as SUJ2, or case-hardened steel such as SCR420 or SCM420) even when a lubrication oil having high fluidity (low viscosity) is used as the lubrication oil of the belt-type continuously variable transmission.

In other words, by using the rolling bearing of this invention as the rolling bearing for supporting the rotating shafts of the pulleys of a belt-type continuously variable transmission, it is possible to maintain sufficient bearing life even when lubrication oil having high fluidity (low viscosity) is used. By doing this, it is possible to improve the power-transmission efficiency by the belt, control the noise of the belt drive, and suppress friction wear between the pulleys and belt, which is desired for a belt-type continuously variable transmission, and thus a belt-type continuously variable transmission having low fuel consumption, low noise and high durability is possible.

The invention claimed is:

1. A rolling bearing for a belt-driven continuously variable transmission comprising:
   an outer race having an inner peripheral surface formed with an outer raceway,
   an inner race having an outer peripheral surface formed with an inner raceway, and
   a plurality of rolling elements rollably provided between the outer raceway and the inner raceway, the outer race being fitted into and supported by a fixed section, the inner race being fitted onto and supported by a section which rotates together with the pulley of the belt-driven continuously variable transmission, so that the pulley is rotatably supported by the fixed section, the rolling bearing for the belt-driven continuously variable transmission being characterized in that at least the outer race is made from an iron-base alloy material containing C from 0.15 weight % to 0.5 weight %, Si from 0.1 weight % to 1.5 weight %, Mn from 0.1 weight % to 1.5 weight %, and Cr from 0.5 weight % to 3.0 weight %, and undergoing carbonitriding, quenching, tempering process and grinding finish, so that the surface portion of the outer raceway has a surface layer that contains C from 0.8 weight % to 1.2 weight %, and N from 0.05 weight % to 0.50 weight %,
   wherein the amount of retained austenite at 50 µm under the surface of the outer raceway is from 20 volume % to 45 volume %, and wherein the residual compression stress at 50 µm under the surface of the outer raceway is from 150 MPa to 500 MPa.

2. A rolling bearing for a belt-driven continuously variable transmission comprising:
   an outer race having an inner peripheral surface formed with an outer raceway,
   an inner race having an outer peripheral surface formed with an inner raceway, and
   a plurality of rolling elements rollably provided between the outer raceway and the inner raceway, the outer race being fitted into and supported by a fixed section, the inner race being fitted onto and supported by a section which rotates together with the pulley of the belt-driven continuously variable transmission, so that the pulley is rotatably supported by the fixed section, the rolling bearing for the belt-driven continuously variable transmission being characterized in that at least the outer race is made from an iron-base alloy material containing C from 0.15 weight % to 0.5 weight %, Si from 0.1 weight % to 1.5 weight %, Mn from 0.1 weight % to 1.5 weight %, and Cr from 0.5 weight % to 3.0 weight %, and undergoing carbonitriding, quenching, tempering process and grinding finish, so that the surface portion of the outer raceway has a surface layer that contains C of from 0.8 weight % to 1.2 weight %, and N from 0.05 weight % to 0.50 weight %, wherein the surface layer has a surface hardness from Hv 720 to Hv 900, and wherein in the section from the surface of the outer raceway to the depth where the maximum shear stress occurs, a carbide or carbonitride having an average particle diameter 50 nm to 500 nm is disposed and precipitated, wherein at least one of Mo of more than 0.3 weight % and not greater than 3.0 weight % and V from 0.1 weight % to 3.0 weight % is contained.

3. A rolling bearing for a belt-driven continuously variable transmission comprising:
   an inner race, an outer race and
   a plurality of rolling elements rollably provided between the inner race and outer race,
   wherein at least one of the inner race, the outer race and the plurality of rolling elements is made of an alloy steel containing, by weight carbon (C) from 0.60% to 1.20%, silicon (Si) from 0.1% to 1.5%, manganese (Mn) from 0.1% to 1.5%, chromium (Cr) of 0.5% to 3.0 %, formed a specified shape, and subjected to carbonitriding, quenching and tempering, and wherein the surface layer of the raceway of the races and or of the rolling contact surface of the rolling elements contains carbon from 0.80 weight % to 1.30 weight %, nitrogen from 0.05 weight % to 0.50 weight %, and wherein the hardness of the surface layer is from 700 HV to 850 HV, and wherein the residual compression stress is from −100 MPa to −500 MPa.

4. The rolling bearing for a belt-driven continuously variable transmission of claim 3, wherein the amount of the retained austenite is from 15 volume % to 45 volume %.

5. The rolling bearing for a belt-driven continuously variable transmission of claim 3, wherein the surface layer contains carbides and/or carbonitrides dispersed and precipitated therein, and wherein the average particle size of the carbides and/or carbonitrides is in the range from 100 nm to 500 nm.

6. The rolling bearing for a belt-driven continuously variable transmission of claim 3 for use in supporting the rotating shaft of the pulley around which a belt for the belt-driven continuously variable transmission extends.

7. A belt-driven continuously variable transmission wherein the rotating shaft of the pulley with a belt extended therearound is supported by the rolling bearing according to claim 3.

* * * * *